United States Patent
Aschoff

(10) Patent No.: US 7,152,639 B2
(45) Date of Patent: Dec. 26, 2006

(54) VENTING DEVICE FOR FUEL TANKS

(75) Inventor: Wolfgang Ludwig Winfried Aschoff, deceased, late of Stuttgart (DE); by Barbara Aschoff, legal representative, Duderstadt-Desingerode (DE); by Dorothee Aschoff, legal representative, Hannover (DE); by Henning Aschoff, legal representative, Duderstadt-Desingerode (DE)

(73) Assignee: DaimlerChrysler AG, Stuttgart (DE)

( * ) Notice: Subject to any disclaimer, the term of this patent is extended or adjusted under 35 U.S.C. 154(b) by 76 days.

(21) Appl. No.: 11/063,340

(22) Filed: Feb. 22, 2005

(65) Prior Publication Data

US 2005/0155670 A1    Jul. 21, 2005

Related U.S. Application Data

(63) Continuation-in-part of application No. PCT/EP03/08742, filed on Aug. 7, 2003.

(30) Foreign Application Priority Data

Aug. 21, 2002 (DE) ............................... 102 38 234

(51) Int. Cl.
*B65B 1/04* (2006.01)

(52) U.S. Cl. .................. 141/286; 141/301; 137/587; 220/86.2

(58) Field of Classification Search ................ 141/286, 141/301, 302, 349, 350; 137/587; 220/86.2
See application file for complete search history.

(56) References Cited

U.S. PATENT DOCUMENTS

| 4,974,645 | A | * | 12/1990 | Johnson | .................. 141/59 |
| 5,244,022 | A | | 9/1993 | Gimby | |
| 5,570,672 | A | | 11/1996 | Kunimitsu | |
| 5,579,742 | A | | 12/1996 | Yamazaki | |
| 5,606,954 | A | | 3/1997 | Yamazaki | |
| 5,657,734 | A | | 8/1997 | Sawamoto | |
| 2002/0017282 | A1 | | 2/2002 | Araki | |

FOREIGN PATENT DOCUMENTS

| DE | 37 44 175 C2 | 2/1989 |
| DE | 41 02 961 | 8/1991 |

* cited by examiner

*Primary Examiner*—Steven O. Douglas
(74) *Attorney, Agent, or Firm*—Klaus J. Bach

(57) ABSTRACT

In a venting device for a fuel tank 1 of a motor vehicle having a filler neck and a venting valve, a circulation pipe is provided which, due to the suction jet effect when refueling circulates gas from the fuel tank back into the tank with the fuel so as to prevent an excessive inflow of fresh air, and which includes a venting pipe extending between venting valve 2 and a filter for discharging excess gases through a filter in order to prevent the escape of fuel vapors into the environment.

9 Claims, 1 Drawing Sheet

VENTING DEVICE FOR FUEL TANKS

This is a Continuation-In-Part Application of International Application PCT/EP2003/008742 filed Aug. 7, 2003 and claiming the priority of German application 102 38 234.4 filed Aug. 21, 2002.

BACKGROUND OF THE INVENTION

The invention relates to a venting device for fuel tanks of vehicles having a venting valve and a filler neck, to which a venting pipe to the fuel tank is connected.

A venting device for a fuel tank for a motor vehicle is disclosed by DE 37 44 175 C2. In this case a first venting pipe with a switching valve extends from the fuel tank to a first filter and a second venting pipe extends from the fuel tank to the first filter or to a second filter. In addition, a venting pipe is provided between the filler neck and the compensating volume, in order that the fuel present in the filler neck can flow off.

The object of the invention is to provide a venting device in such a way that an excessive charging of the venting filter and an escape of fuel vapor from the tank filler neck is prevented.

SUMMARY OF THE INVENTION

In a venting device for a fuel tank 1 of a motor vehicle having a filler neck and a venting valve, a venting pipe is provided which, due to the suction effect of a fuel jet from the refueling nozzle and the fuel inlet opening tightly engaging the refueling nozzle, prevents an excessive inflow of fresh air, and which includes a recirculation pipe between the venting valve and the filler neck for removing venting gases in order to prevent their escape into the environment.

In this way, a recirculation volumetric flow is established between the fuel tank and the filler neck, which is equal to the fuel volumetric flow when refueling and which, even with a large volumetric refueling pump flow, generates a sufficient circulation volumetric flow, ensuring a suction jet effect of the entering fuel jet, between the fuel tank and the filler neck.

It is advantageous if the filler neck has a cross-section which is reduced to the diameter of a fuel pump nozzle and the venting pipe is arranged downstream of the reduced cross section of the filler neck in the direction of flow, the reduced opening cross section of the filler neck having a sealing element for the fuel pump nozzle in the form of a diaphragm or a flexible plastic lip. Due to the suction jet effect it is therefore largely the recirculation pipe which is subjected to a vacuum, since the reduced cross-section and/or the sealing element form a flow barrier for the fresh air. The inflow of fresh air is reduced to a minimum.

According to a preferred embodiment the reducing member is finally designed as a filling level-dependent float valve. This prevents liquid fuel from entering the venting pipe.

According to a another embodiment, it is additionally possible for the reducing member to be a flow-dependent needle valve or a circulation valve with a flow-dependent opening cross section. Preferably, the circulation valve has a valve chamber, a nozzle and a needle corresponding to the nozzle and a float, the needle being preloaded against the nozzle by a preloading element. The needle valve is therefore basically closed and opens its flow cross section according to the venting volumetric flow generated by the refueling.

It is also advantageous for this purpose if the circulation valve is arranged at the end of the venting pipe or directly upstream of the filler neck in respect of the venting flow. This prevents the venting pipe from being filled with fuel.

Finally, according to a preferred embodiment of the invention the venting pipe is connected by way of the venting valve indirectly to the fuel tank and directly to the venting valve. This provides a simple method of connection to the tank and, where desired, also facilitates retrofitting of the recirculation pipe.

Preferably, a filter is connected to the venting valve by way of a filter line, the venting pipe being arranged on the venting valve or in the filter line. The recirculation pipe or the recirculation valve in the form of a needle valve relieves the filter, since the suction jet effect during refueling does not draw in an excess volumetric flow of fresh air. The fuel tank air present at the venting valve can flow both directly from the venting valve and via the filter line into the recirculation pipe.

The opening of the venting pipe in the filler neck and the filler neck suck the air drawn in by the suction jet effect during refueling of the fuel tank out of the tank interior through the venting pipe. This prevents overloading of the activated charcoal filter and any excessive escape of fuel vapor into the surroundings.

The invention will become more readily apparent from the following description with reference to the accompanying:

DESCRIPTION OF A PREFERRED EMBODIMENT

Figures 1, 2:
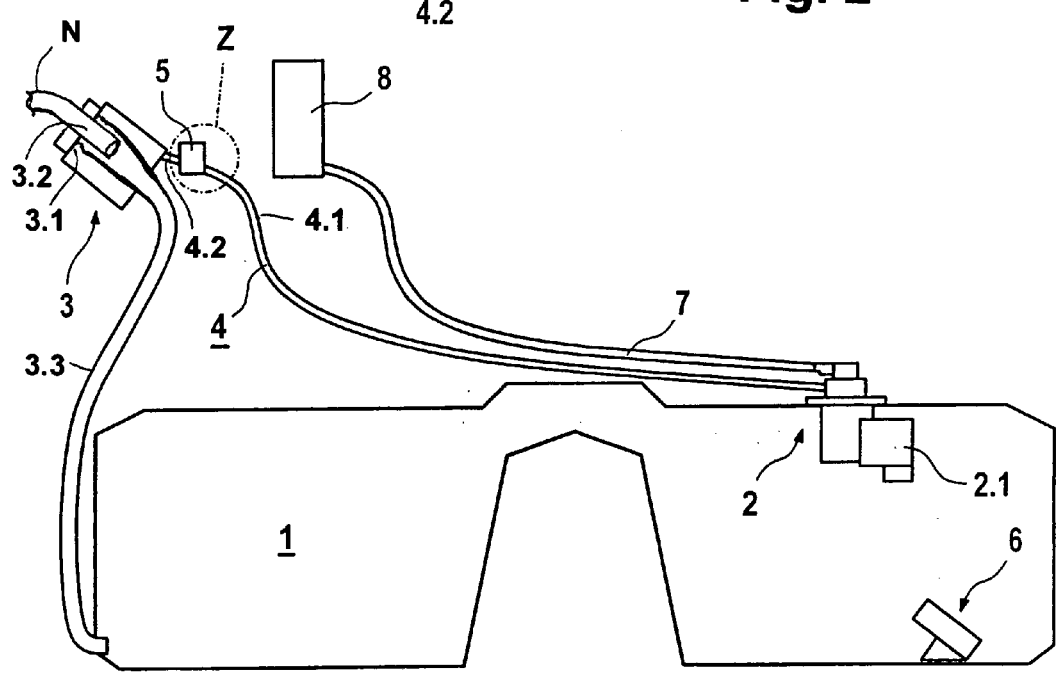
FIG. 1 shows a schematically a fuel tank with venting valve, a filler neck and a recirculation pipe.
FIG. 2 shows the venting valve.

FIG. 1 shows a fuel tank 1 for motor vehicles, which has a filler neck 3 and a venting valve 2. The venting valve 2 is arranged in the fuel tank top wall and has a separating chamber 2.1. A reservoir cup pump 6, which fills a reservoir cup (not shown) with fuel, is furthermore provided inside the fuel tank 1.

The venting valve 2 is on the one hand connected by way of a filter line 7 to a filter 8, by way of which excess gas can escape to the ambient air. The filter 8 is preferably an activated carbon filter. The venting valve 2 is further connected via a venting pipe 4 or a first part 4.1 of a venting pipe to the filler neck 3. A reducing member 5 in the form of a float needle valve is provided inside the venting pipe 4, that is to say, downstream of the first part 4.1 of the venting pipe and upstream of a second part 4.2 of a venting pipe.

The float needle valve 5 has a valve chamber 5.1 with a nozzle opening 5.2 and a needle 5.3 in the form of a float. The needle 5.3 is preloaded by a preloading element 5.4 against the nozzle opening 5.2 which forms a seat surface for the needle 5.3. According to FIG. 2, an upper connection 5.5 of the float needle valve 5 is provided on the first part of the venting pipe 4.1, this first part of the venting pipe 4.1 connecting the float needle valve 5 to the venting valve 2. A lower connection 5.6 is furthermore provided, which connects the float needle valve 5 to the filler neck 3 by way of the second part of the venting pipe 4.2.

The second part of the venting pipe 4.2 joins the filler neck 3 downstream of a cross sectional diaphragm of the filler neck 3, with respect of the direction of flow of the fuel, the diaphragm 3.1 including an opening 3.2 for receiving a fuel pump nozzle N and having approximately the same diameter as a fuel pump nozzle.

Preferably, the diaphragm 3.1 is provided with a seal structure in the form of a flexible plastic lip to sealingly engage the fuel pump nozzle N when it is inserted into the filler neck 3 to prevent ambient air from being sucked into the tank pipe 3.3 during refueling but rather, gas sucked in with the fuel is supplied via the venting pipe 4 and the needle valve 5 from the fuel tank 1. The needle float valve 5 controls the recirculation gas flow volume and prevents fuel from flowing back into the vent pipe 4 upon excessive filling of the tank. Charging of the filter 8 by fuel from fuel vapors is therefore minimal.

The invention claimed is:

1. A venting device for fuel tanks (1) of motor vehicles, said venting device having a venting valve (2), for mounting to the fuel tank (1) and connected by way of a circulation pipe (4) to a filler neck (3) of the fuel tank (1), the circulation pipe (4) having a throttling member (5), in the form of a circulation control valve having a flow-dependent opening cross section, said throttling member (5) being a fill level-dependent float valve (5) having a valve chamber (5.1), with a nozzle opening (5.2) and a needle (5.3) in the form of a float member disposed in the nozzle opening.

2. The device as claimed in claim 1, wherein the needle (5.3) of the circulation valve (5) is preloaded in the direction of the nozzle (5.2) by a preloading element (5.4).

3. The device as claimed in claim 1, wherein the throttling member (5) is a flow-dependent needle valve (5).

4. The device as claimed in claim 1, wherein the filler neck (3) has an opening of a reduced cross section which is only large enough to accommodate a fuel pump nozzle and the circulation pipe (4) is arranged downstream of the opening of the filler neck (3) in respect of the direction of flow of the fuel when refueling.

5. The device as claimed in claim 1, wherein the circulation valve (5) is arranged at the end of the circulation pipe (4) or directly upstream of the filler neck (3) in respect of the venting flow.

6. The device as claimed in claim 1, wherein the circulation pipe (4) is connected indirectly to the fuel tank (1) by way of the venting valve (2), and directly to the throttling member (5).

7. The device as claimed in claim 1, wherein a filter (8) is in communication with the venting valve (2) by way of a filter line (7), the circulation pipe (4) being connected to one of the venting valve (2) and the filter line (4).

8. The device as claimed in claim 4, wherein the opening with reduced cross section of the filler neck (3) includes a sealing element for securely engaging the fuel pump nozzle in the nature of one of a diaphragm and a flexible plastic lip.

9. The device as claimed in claim 8, wherein the opening of the circulation pipe (4) in the filler neck (3) and the filler neck (3) are designed in such a way that the air drawn in by the suction jet effect during refueling of the fuel tank (1) is sucked out of the tank interior through the circulation pipe (4).

* * * * *